(12) United States Patent
Biskeborn et al.

(10) Patent No.: US 7,602,579 B2
(45) Date of Patent: Oct. 13, 2009

(54) METHODS FOR ENABLING FUNCTIONALITY IN MULTI-MODAL DATA STORAGE SYSTEMS

(75) Inventors: Robert Glenn Biskeborn, Hollister, CA (US); Jason Liang, San Jose, CA (US); Calvin Shyhjong Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/172,867

(22) Filed: Jul. 14, 2008

(65) Prior Publication Data

US 2008/0259486 A1     Oct. 23, 2008

Related U.S. Application Data

(63) Continuation of application No. 11/462,330, filed on Aug. 3, 2006.

(51) Int. Cl.
*G11B 5/584* (2006.01)
(52) U.S. Cl. .................................................. 360/77.12
(58) Field of Classification Search ............... 360/77.12, 360/75, 240; 369/30.32; 380/282; 709/246; 345/710
See application file for complete search history.

(56) References Cited

U.S. PATENT DOCUMENTS

| | | | | |
|---|---|---|---|---|
| 4,631,663 A | * | 12/1986 | Chilinski et al. ............ | 712/229 |
| 4,789,907 A | | 12/1988 | Fischetti et al. ............. | 386/107 |
| 4,797,746 A | | 1/1989 | Ashcraft ..................... | 348/441 |
| 4,843,485 A | | 6/1989 | Reitmeier ................... | 360/9.1 |
| 5,063,494 A | * | 11/1991 | Davidowski et al. ........ | 709/246 |
| 5,245,485 A | | 9/1993 | Dunn et al. .................. | 360/69 |
| 5,845,265 A | | 12/1998 | Woolston .................... | 705/37 |
| 5,905,613 A | | 5/1999 | Biskeborn et al. .......... | 360/130.21 |
| 6,085,176 A | | 7/2000 | Woolston .................... | 705/37 |
| 6,172,829 B1 | | 1/2001 | Ozaki et al. ................. | 360/48 |
| 6,172,837 B1 | | 1/2001 | Fasen ......................... | 360/75 |
| 6,202,051 B1 | | 3/2001 | Woolston .................... | 705/27 |
| 6,266,651 B1 | | 7/2001 | Woolston .................... | 705/27 |
| 6,526,004 B1 | | 2/2003 | Otsuka et al. ............... | 369/30.32 |

(Continued)

FOREIGN PATENT DOCUMENTS

EP     1148738 A1     10/2001

(Continued)

OTHER PUBLICATIONS

Office Action Summary from U.S. Appl. No. 11/462,330 mailed on Oct. 27, 2008.

(Continued)

*Primary Examiner*—Fred Tzeng
(74) *Attorney, Agent, or Firm*—Zilka-Kotab, PC

(57) ABSTRACT

A method for enabling different modes on a multi-modal data storage system such as a tape-based data storage system includes enabling a data storage system to operate in at least one of two modes, a first of the modes being different than a second of the modes. In one embodiment, the data storage system has all physical components required to operate in the first and second modes. An ability to operate in at least one of the modes is not allowed prior to enabling the data storage system to operate in the at least one of the modes.

20 Claims, 14 Drawing Sheets

U.S. PATENT DOCUMENTS

| | | | |
|---|---|---|---|
| 6,529,453 B1 * | 3/2003 | Otsuka et al. | 369/30.32 |
| 7,043,716 B2 | 5/2006 | Zimmer et al. | 717/107 |
| 7,154,691 B2 | 12/2006 | Girvin et al. | 360/61 |
| 7,171,507 B2 | 1/2007 | Azimi et al. | 710/305 |
| 7,181,017 B1 * | 2/2007 | Nagel et al. | 380/282 |
| 7,212,212 B2 * | 5/2007 | Cherdron | 345/581 |
| 7,277,870 B2 | 10/2007 | Mourad et al. | 705/51 |
| 7,366,694 B2 | 4/2008 | Lazerson | 705/38 |
| 2001/0007981 A1 | 7/2001 | Woolston | 705/27 |
| 2001/0009008 A1 | 7/2001 | Ovadya et al. | 707/10 |
| 2002/0072942 A1 | 6/2002 | Kuykendall et al. | 705/7 |
| 2002/0116275 A1 | 8/2002 | Woolston | 705/26 |
| 2004/0061716 A1 * | 4/2004 | Cheung et al. | 345/710 |
| 2004/0133512 A1 | 7/2004 | Woolston | 705/39 |
| 2005/0015345 A1 | 1/2005 | Yao et al. | 705/64 |
| 2005/0018574 A1 | 1/2005 | Jenkins et al. | 369/53.21 |
| 2005/0033655 A1 | 2/2005 | Woolston | 705/26 |
| 2005/0082407 A1 | 4/2005 | Saliba et al. | 242/332.4 |
| 2005/0134989 A1 | 6/2005 | Girvin et al. | 360/61 |
| 2005/0198677 A1 | 9/2005 | Lewis | 725/87 |
| 2005/0283446 A1 | 12/2005 | Dettinger et al. | 705/400 |
| 2006/0089912 A1 | 4/2006 | Spagna et al. | 705/51 |
| 2006/0095792 A1 | 5/2006 | Hurtado et al. | 713/189 |
| 2006/0149739 A1 | 7/2006 | Myers | 707/9 |
| 2006/0166642 A1 | 7/2006 | Puthenpura et al. | 455/406 |
| 2006/0166643 A1 | 7/2006 | Puthenpura et al. | 455/406 |
| 2007/0026371 A1 | 2/2007 | Wood | 434/317 |
| 2007/0047142 A1 | 3/2007 | Biskeborn | 360/129 |
| 2007/0047146 A1 * | 3/2007 | Biskeborn et al. | 360/240 |

FOREIGN PATENT DOCUMENTS

WO    WO 01/04725 A2    1/2001

OTHER PUBLICATIONS

Office Action Summary from U.S. Appl. No. 11/462,330 mailed on Jun. 5, 2008.

Office Action Summary from U.S. Appl. No. 11/462,330 mailed on Apr. 29, 2009.

* cited by examiner

METHODS FOR ENABLING FUNCTIONALITY IN MULTI-MODAL DATA STORAGE SYSTEMS

RELATED APPLICATIONS

This application is a continuation of U.S. patent application Ser. No. 11/462,330 filed Aug. 3, 2006, which is incorporated by reference.

FIELD OF THE INVENTION

The present invention relates to data storage systems, and more particularly, this invention relates to methods for managing data storage systems capable of selectively reading and/or writing in multiple formats.

BACKGROUND OF THE INVENTION

Business, science and entertainment applications depend upon computing systems to process and record data. In these applications, large volumes of data are often stored or transferred to nonvolatile storage media, such as magnetic discs, magnetic tape cartridges, optical disk cartridges, floppy diskettes, or floptical diskettes. Typically, magnetic tape is the most economical, convenient, and secure means of storing or archiving data.

Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is currently measured in hundreds of gigabytes.

In today's data storage market, customers are required to replace their existing hardware in order to upgrade to the next generation of higher capacity, higher data-rate storage devices and associated media. Using tape-based storage as an example, today there are only two kinds of tape drives currently on the market for a given product family: those for a single older, or legacy, format; and those for a single newer format, e.g., a format less than 2 years old. For customers with libraries containing hundreds and even thousands of drives, this can become an enormous investment of time and resources, sometimes so much so that it may not be financially or practically feasible to upgrade.

Imagine a scenario where the user has a large investment in media of a legacy format. The user wants to upgrade to a new system to decrease archiving time, but is not ready to purchase large quantities of media in a new format, and does not want to invest further in drives in the legacy format. What is needed is a way to allow a user to purchase a single drive that allows the user to use a specific mode of a data storage system (e.g., the legacy format), and when the user is ready, enables functionality that allows the user to use another mode of the data storage system (e.g., the new format).

As another example, consider a company (user) that is ready to upgrade to a new tape format, but is contemplating a merger where the merging company uses a legacy format that is not compatible with the company's present systems, nor with hardware in the new format. If the merger goes through, the company will suddenly need access to the data from the merging company and so will need to purchase drives capable of reading the legacy format. These legacy drives are, of course, purchased in addition to the new format drives. The overall cost, implementation time, and system resources needed may be more than the company is willing to spend.

What is needed is a way to allow a user to use a specific mode of a data storage system (e.g., the new format), and if needed allow the user to use another mode of the data storage system (e.g., the legacy format of the merging company).

There is accordingly a clearly-felt need in the art for methods for managing storage systems capable of reading and/or writing in multiple modes, such as reading/writing in different formats. It would also be desirable to provide to customers the ability to read multiple formats for such things as backward and forward compatibility, as well as compatibility across competing formats. These unresolved problems and deficiencies are clearly felt in the art and are solved by this invention in the manner described below.

SUMMARY OF THE INVENTION

A method for enabling different modes on a multi-modal data storage system includes enabling a data storage system to operate in at least one of a minimum of two modes, a first of the modes being different than a second of the modes. In one embodiment, the data storage system has all physical components required to operate in the first and second modes. An ability to operate in at least one of the modes is not allowed prior to enabling the data storage system to operate in the at least one of the modes.

A method for enabling operation in different tape formats on a multi-modal tape-based data storage system according to another embodiment includes enabling a tape-based data storage system to operate in a second format different than a first format. The tape-based data storage system is enabled to operate in the first format but not in the second format prior to enabling the tape-based data storage system to operate in the second format. The operation in the second format includes at least one of reading and writing in the second format.

A method for on-demand enablement of functionality of a multi-modal data storage system according to a further embodiment includes allowing a data storage system to operate in a first mode but not a second mode, the first mode being different than the second mode; allowing the data storage system to operate in the second mode upon occurrence of a first condition; and upon occurrence of a second condition, no longer allowing the data storage system to operate in the second mode.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

Figure 1:
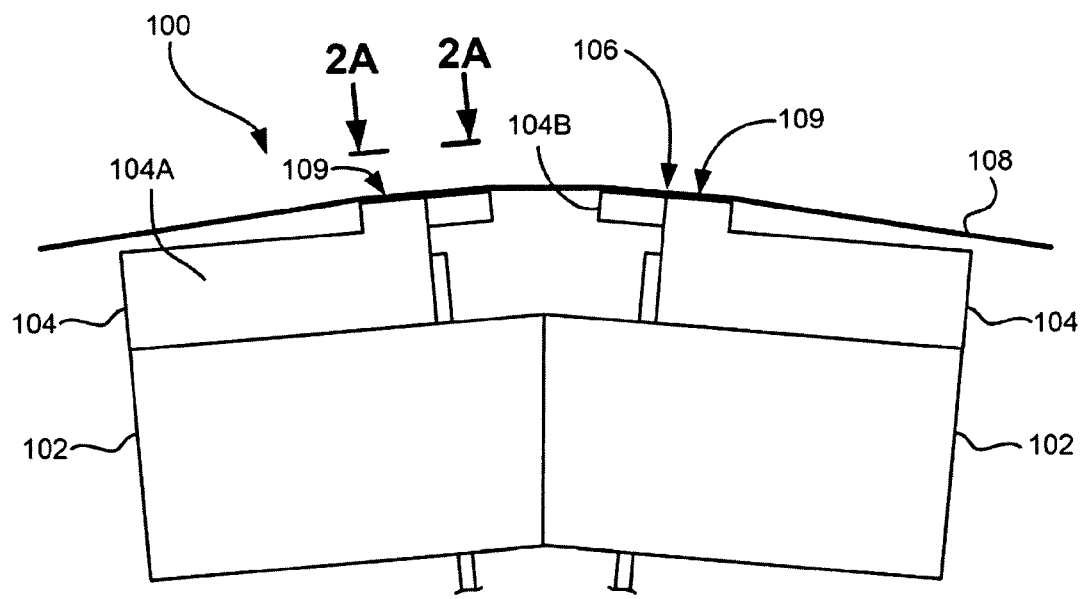
FIG. 1 is a side view of a traditional flat-lapped magnetic tape head.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

The embodiments described below disclose methods for managing data storage systems capable of functioning in multiple modes, such as interfacing with portable or fixed media in various formats, accessing certain features on the media available only when a certain mode is enabled, etc. These methods include business methods, security methods, computer and software implemented processes, and methods for on-demand offerings, to list a few.

To ease the understanding of the reader and to please the present invention in context, much of the following description shall be in terms of a tape-based data storage system. However, it should be kept in mind that the present invention is not limited to tape-based data storage systems, but rather the principles and methodology presented herein can apply to any type of data storage system including but not limited to storage systems based on magnetic tape, magnetic disk, optical disk, floppy diskettes, floptical diskettes, flash memory and other miniature nonvolatile RAM media, etc.

The format of the following description will be to first describe data storage systems that may be used in the context of the inventive methods presented thereafter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

According to a tape-based data storage device embodiment of the present invention, a drive having a head capable of reading and/or writing to magnetic media such as magnetic tape in multiple formats, multiple heads in the various formats, or a head as shown in FIG. 1 may be employed. The former may be accomplished by equipping the head with two arrays of elements (readers and/or writers), each array being associated with a different format. Thus, the system can write and/or read data in both legacy and advanced formats (or competing formats), and in doing so can enable backward, lateral, and/or forward compatibility with legacy or competing media types. This is an important criterion for customers wishing to move to a new or different format yet having data stored on media in an older format.

On any tape head, both the spacing between the elements and the element dimensions conform to a particular data format. Usually, a head designed for one format will not work with a tape written in another format, as the servo readers usually will not align with the servo tracks. In addition the data elements may not align with the written tracks. Accordingly, one wishing to keep data stored on a magnetic medium in one format but wishing to move to equipment in a new format must either keep an operational drive designed for the earlier format, or transfer the data to a medium in the new format.

FIG. 1 illustrates a traditional flat-lapped bi-directional, two-module magnetic tape head 100, in accordance with one embodiment. As shown, the head includes a pair of bases 102, each equipped with a module 104. The bases are typically "U-beams" that are adhesively coupled together. Each module 104 includes a substrate 104A and a closure 104B with readers and writers 106 situated therebetween. In use, a tape 108 is moved over the modules 104 along a tape bearing surface 109 in the manner shown for reading and writing data on the tape 108 using the readers and writers 106. Conventionally, a partial vacuum is formed between the tape 108 and the tape bearing surface 109 for maintaining the tape 108 in close proximity with the readers and writers 106.

Figure 2B:
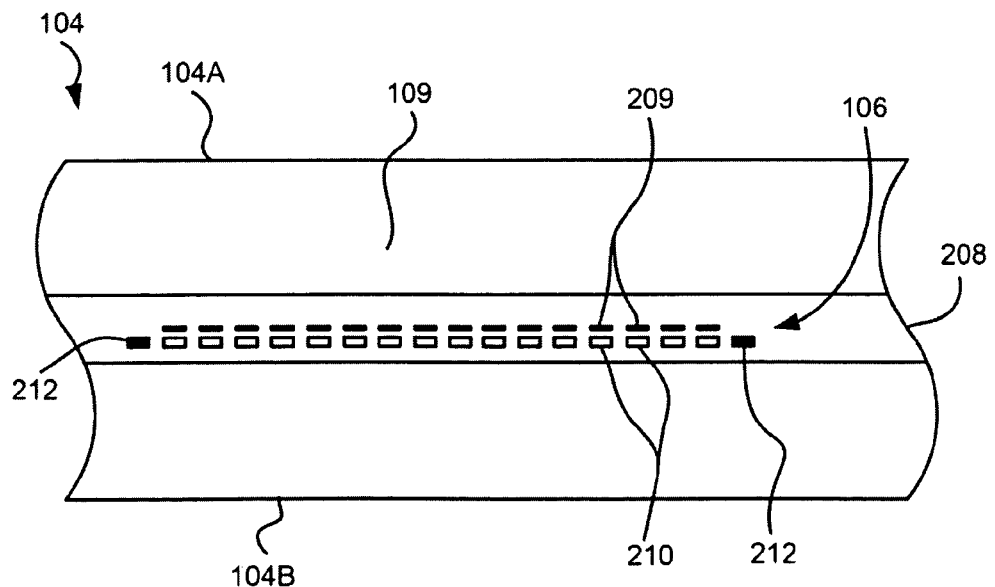
FIG. 2B is a detailed view taken from Circle 2B of FIG. 2A.
Figure 2A:
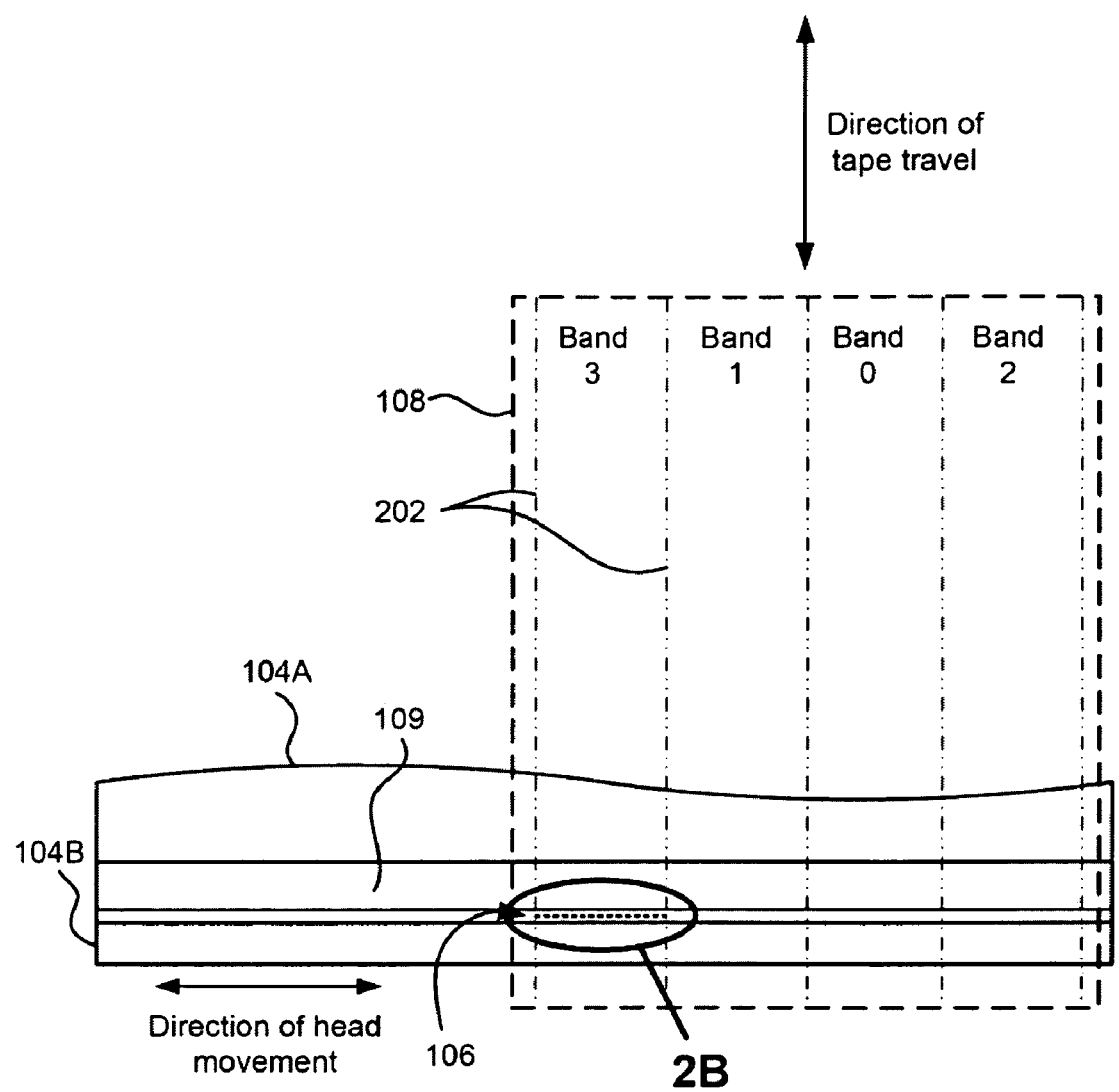
FIG. 2A is a tape bearing surface view taken from Line 2A of FIG. 1.

FIG. 2A illustrates the tape bearing surface 109 of one of the modules 104. The tape 108 is shown in dashed lines. The module is long enough to be able to support the tape as the head steps between data tracks.

As shown, the tape 108 includes four data bands (Band 0-3) that are defined between servo tracks 202. Each data band may include a number of data tracks, for example 96 data tracks (not shown). During read/write operations, the elements 106 are positioned within one of the data bands. Outer readers, sometimes called servo readers, read the servo tracks 202. The servo signals are in turn used to keep the elements 106 aligned with a particular track during the read/write operations. Typically, a coarse positioner (worm gear, etc.) places the head generally adjacent a given data track, then a fine positioner (voice coil, etc.) keeps the heads aligned using the servo tracks.

FIG. 2B depicts a plurality of read/write elements 106 formed in a gap 208 on the module 104 of FIG. 2A. As shown, the array of elements 106 includes, for example, eight writers 209, eight readers 210, and two servo readers 212. As noted by considering FIGS. 1 and 2A-B together, each module 104 will include a complementary set of elements 106.

As mentioned above with reference to FIG. 1, a typical tape head includes two modules, each module having an array of data elements thereon for reading and/or writing data in a particular data format. The present invention may be implemented in the context of a two module head capable of reading and/or writing in two different data formats. One skilled in the art will also appreciate that the embodiments herein can also be expanded to heads having a single module (where, for example, the single module may be formed on a single substrate) and heads having more than two modules. The present invention may also be implemented in the context of a head where modes such as the ability to read and/or write are selectively enabled.

Figure 3:
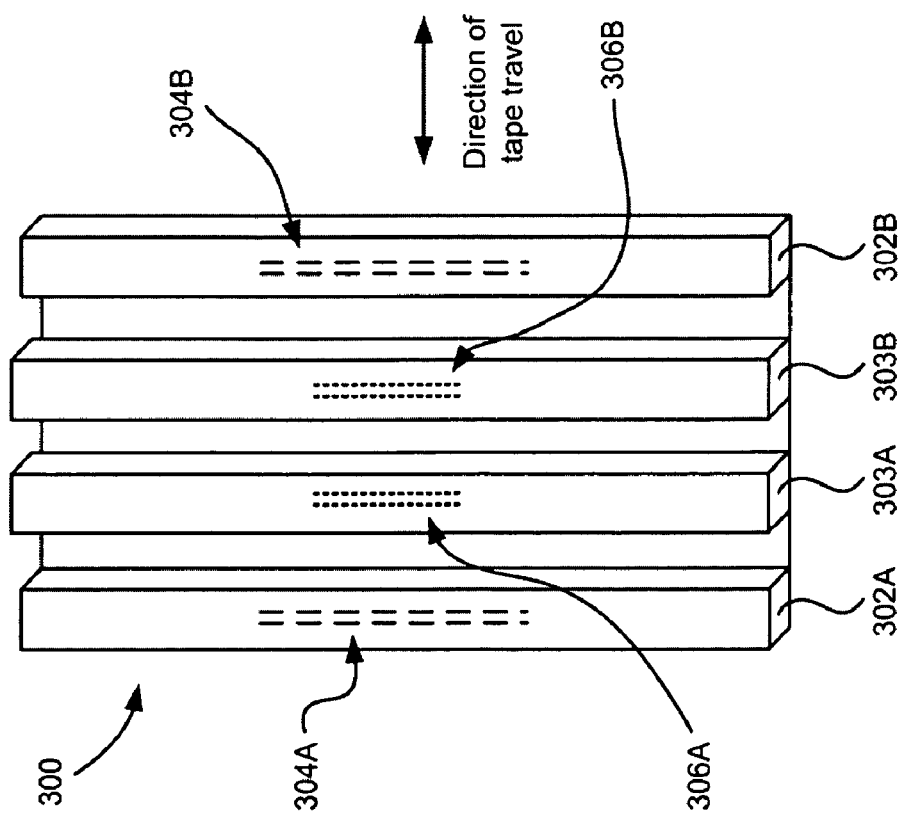
FIG. 3 is a tape bearing surface view of a head including multiple format read/write elements on different modules.

FIG. 3 illustrates a multi-format head 300. As shown, the head 300 includes two sets of modules, an outer pair of modules 302A, 302B, and an inner pair of modules 303A, 303B aligned in a direction parallel to the direction of tape travel relative to each other. The outer pair of modules 302A, 302B each has an array of complementary elements 304A, 304B arranged according to a first format, while the inner pair of modules 303A, 303B each has an array of complementary elements 306A, 306B arranged for a second format different than the first data format. In both pairs, the complementary elements (304A with 304B, 306A with 306B) are displaced from each other in the direction of tape travel. When media in the first format is presented to the system, the array of elements 304A, 304B in the outer pair of modules 302A, 302B are operated. When media in the second format is presented to the system, the array of elements 306A, 306B in the inner pair of modules 303A, 303B are operated.

In read-while-write operation in the first format for example, the readers on the trailing module 302B read the data that was just written by the leading module 302A so that the system can verify that the data was written correctly. If the data is not written correctly, the system recognizes the error and rewrites the data.

Figure 4:
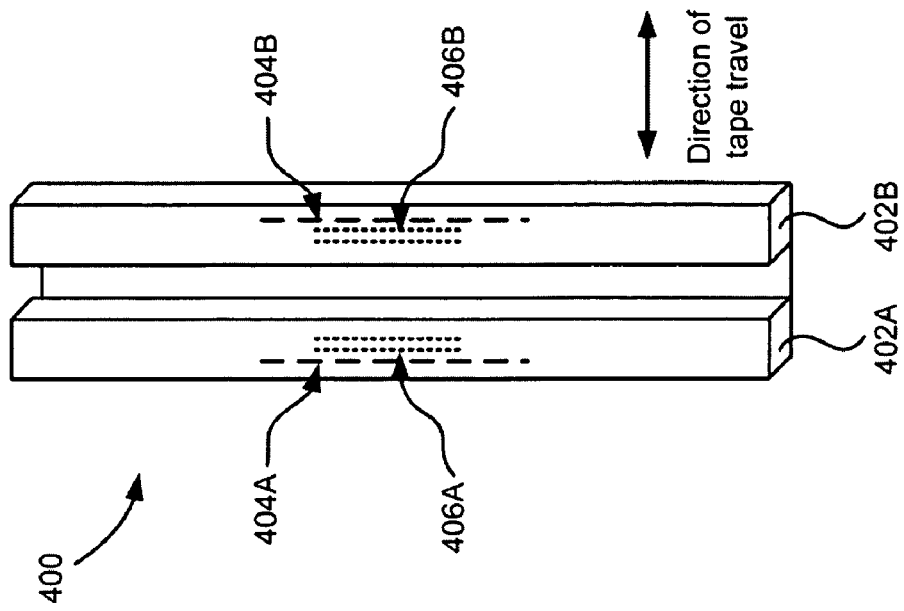
FIG. 4 is a tape bearing surface view of a head including multiple format read/write element arrays on the same module.

Another multi-format head 400 is shown in FIG. 4. This tape head 400 is composed of Read-Read-Write (R-R-W) modules. Tape head 400 includes merged primary data format read/write elements 404A, 404B and secondary data format read elements 406A, 406B on each module 402A, 402B. In this instance, head 400 is capable of reading a secondary format corresponding to secondary format read elements 406A, 406B. Head 400 is further capable of both reading and writing with the primary format corresponding to primary read/write elements 404A, 404B.

With continued reference to FIG. 4, the primary and secondary elements 404A, 404B, 406A, 406B are aligned parallel to the direction of tape travel, relative to each other. Typically, each row of elements is fabricated in sequential fabrication sequences. For example, elements 404A, 404B may be formed first. Then the secondary elements 406A, 406B are fabricated above the primary elements 404A, 404B.

Figure 5:
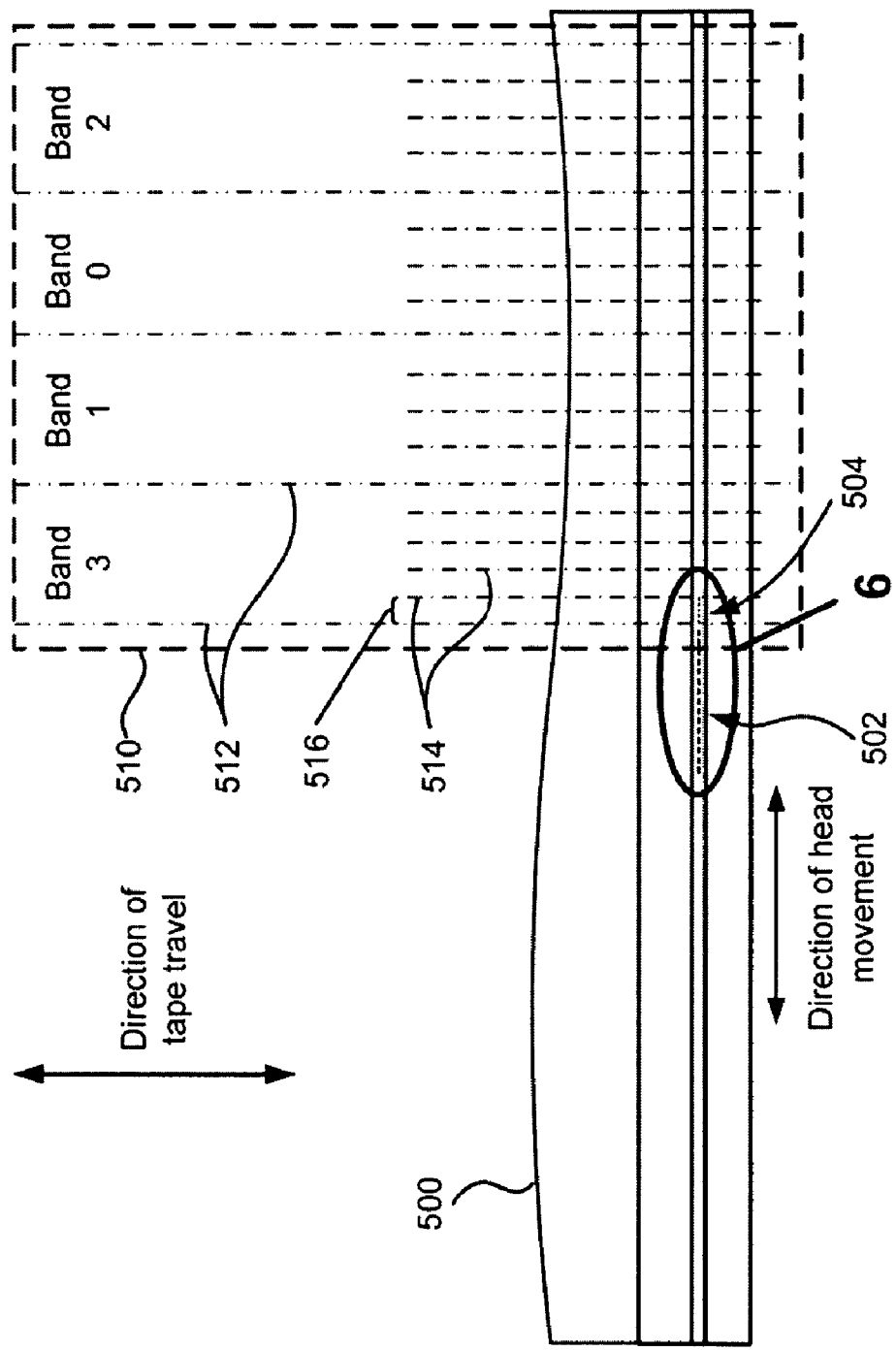
FIG. 5 is a tape bearing surface view of a tape head including two arrays of elements on the same module, each array being adapted for a different format.

FIG. 5 illustrates a tape bearing surface view of a module 500 having a first array 502 of elements associated with a first data format, and a second array 504 of elements associated with a second data format, where the first and second data formats are different. Again, the elements can include readers, writers, or both, and typically at least two modules are present to provide read-while-write capability.

The tape 510 is shown in dashed lines. While it is not typical to write data in two different formats on the same tape, the present embodiment would enable this feature, as described below. To illustrate different formats, FIG. 5 shows data in the first and second formats overlapping. This is for illustration purposes, and one skilled in the art will appreciate that the data bands in the two formats would not typically be concurrently present on the same area of the tape. Data in the first format is associated with servo tracks 512 and data bands (Band 0-3). Data in the second format is associated with servo tracks 512 and 514. The data bands 516 in the second format are significantly smaller and so are not individually identified alphanumerically. However, a representative data band 516 is shown in FIG. 5 for illustrative purposes.

The second data format may be a new generation relative to the first data format. The first and second data format may also be a formats used by competing vendors, used in different standards, etc. Typically, the differences between formats will include one or more of: differing servo band locations, differing written track width, differing track density per data band or tape width, differing track centerline-to-centerline spacing, differing element centerline-to-centerline spacing, etc. Accordingly, the arrays will have servo reader position, element spacing, element width, etc. that are designed to function in the format with which associated. Another embodiment includes two arrays that each use different read and/or write gaps to allow reading and/or writing in different data densities.

In one embodiment, the second format is a scaled-down version of the first format, especially in feature size. Accordingly, the second array 504 would then be a scaled-down version of the first array 502. For example, the second array 504 may have the same number of data tracks per band, but is scaled down from the first array 502, for example by a factor of about 5. In other words, the second array 504 is about 20% the width of the first array 502. Thus, the format characteristics are also scaled down. For example, the track density on the tape should increase by approximately 5× in the second format as compared to the first format. If the linear data density also doubles, the tape capacity in the second format will be 10× the first format.

Furthermore, the advanced format data organization, e.g. track layout, is not necessarily in any way coupled to the legacy format. Coupling as by forcing a sharing of elements may not be desirable as it may force compromised future areal density or degraded head performance.

With continued reference to FIG. 5, the first and second arrays 502, 504 are formed in the same gap on the module 500 and are generally aligned laterally adjacent to each other in a direction transverse to the direction of media travel.

In operation, the tape drive system or host system can identify the format of the servo pattern on the tape and/or the format of the data on the tape using one of several techniques. One way to determine the format(s) is by reading a cartridge memory chip in the tape cartridge that identifies the format. Another way to identify the format is by reading a small portion of the data bands and matching, for example, the servo tracks to a look up table (LUT). Note that all arrays may be active at this time, or the system may sequentially operate the arrays. In other embodiments, the user may indicate which format is used on the tape. Once the format is identified, the controller, host, or user selects the proper array for reading and writing. The system energizes the array associated with the identified format, such as by energizing the leads coupled to the desired array. Now active, the desired array is aligned with one of the data bands in a standard way, e.g., by servoing, and the tape is passed over the head for reading/writing. Preferably, either one array or the other is energized at a time during standard read/write operations.

In one embodiment, the elements for both arrays 502, 504 are built simultaneously during thin film buildup. For instance, consider elements in a "piggyback" configuration. This type of element typically includes a reader formed on a substrate, with a writer formed thereon. The reader and writer may be positioned so that one of the reader shields also functions as a component of one of the writer poles. During construction of a multi-format piggyback head, the readers of the first array 502 are formed concurrently with the readers of the second array 504. Then the writers of the first array 502 are formed concurrently with the writers of the second array 504. The readers of the first and second arrays 502, 504 are aligned along a line transverse to the direction of media travel, and thus the writers of both arrays are also aligned. Likewise, for an interleaved head, the readers for both arrays 502, 504 can all be formed during a single processing sequence, and the writers can be formed in another processing sequence.

The arrays can be slightly offset in a vertical direction for design considerations. For example, the upper shields for readers in the first array may be formed concurrently with the lower shields for readers in the second array. Then the readers in the second array are completed in subsequent steps. Thus, in some embodiments, the elements are formed concurrently in the same processing sequence, though only some of the processing steps affect both arrays 502, 504.

In further embodiments, the arrays can be formed by independent processing sequences. For example, one array can be completed prior to forming the other array. The arrays may be aligned in a direction transverse to the direction of tape motion, or can be displaced transverse to the direction of tape travel and offset in a direction parallel to the direction of tape travel.

Further, each array can be formed on an individual module, where the arrays in each format are displaced transverse to the direction of tape travel.

Forming the various arrays concurrently reduces process steps over the contemplated methods described above, such as forming elements in tandem parallel to the tape travel direction or even placing R/W arrays for different formats on different modules. One skilled in the art will appreciate the advantages achieved by processing all of the elements concurrently, including lower cost, faster production time, reduced chance of error, etc. Write and read transducer magnetic gaps may be independently optimized for each format.

Because the arrays 502, 504 of elements are adjacent each other laterally, the width of the head may need to be increased slightly to ensure that the tape bearing surface supports the entire tape at all possible positions. However, the width of the head does not necessarily need to increase.

Figure 6:
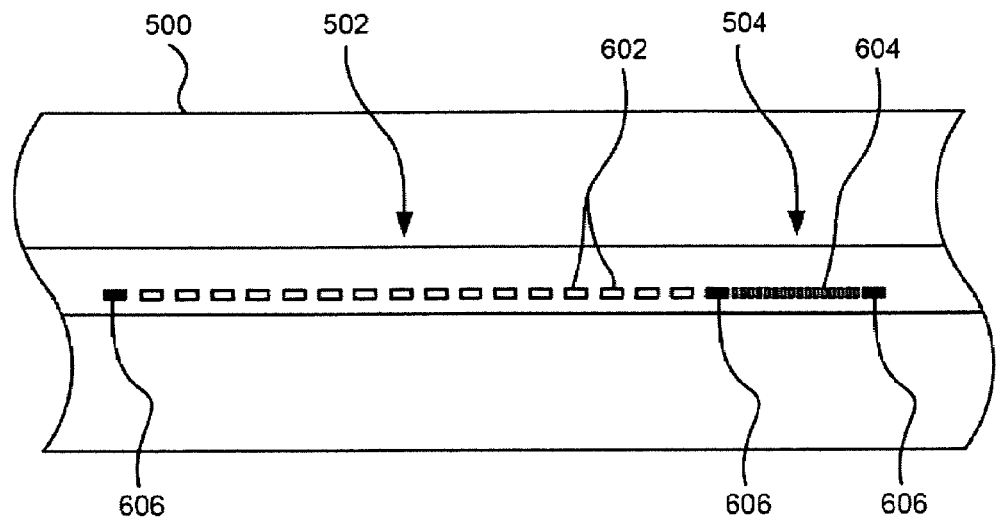
FIG. 6 is a detailed view taken from Circle 6 of FIG. 5 showing two arrays of elements according to one embodiment.
Figure 7:
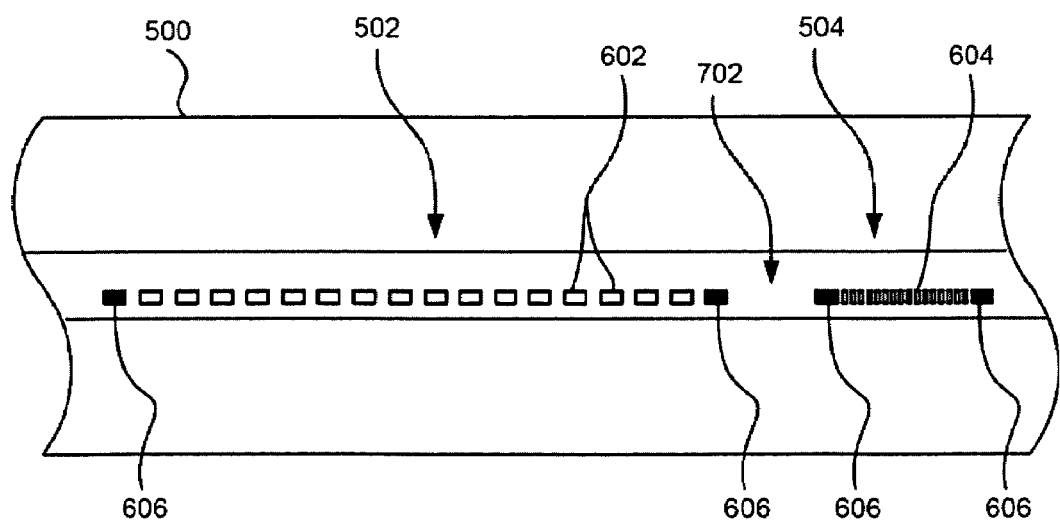
FIG. 7 is a detailed view of a tape bearing surface of a tape head showing two arrays of elements spaced apart laterally.

One embodiment of the present invention is illustrated in FIG. 6, wherein two arrays 502, 504 are formed on a module 500. As shown, the elements 602 of the first array 502 and the elements 604 of the second array 504 are positioned generally laterally adjacent each other. In some embodiments, including this one, the first and second arrays 502, 504 can share one of the servo readers 606. However, it may be advantageous to space the second array 504 laterally from the first array 502, as shown in FIG. 7.

One advantage of spacing the arrays 502, 504 apart is that, because portions of the tape near or at the edges of the tape may tend to induce more wear on the head than other parts of the tape, the area of greatest wear may then be between the arrays (when reading outer data bands). This is particularly so with older tapes that tend to be rougher and thicker, and produce more wear than newer tapes, as newer tapes are designed to reduce wear. The consequence of the uneven wear pattern is that when reading and writing the outer band of a tape in the first format with the first array 502, the edge of the tape might cause wear adjacent to the first array 502, and thus on the second array 504. By having the arrays spaced apart slightly, wear from the edge portions of the tape will occur between the arrays, e.g., in area 702.

It is worth noting that the same uneven wear patterns might occur when reading and writing using the second array 504, i.e., the edge portions of the tape will cause more wear adjacent the second array 504, and as such, the wear will likely occur on the first array 502. However, assuming the second array 504 is for a format that is more modern than the format of the first array 502, the tape will likely be a newer tape that is smoother. Further, the first array 502, probably having larger elements and reading a lower linear density, may be more tolerant to wear. Furthermore, all elements may be provided with a wear resistant coating such as diamond-like carbon.

Figure 8:
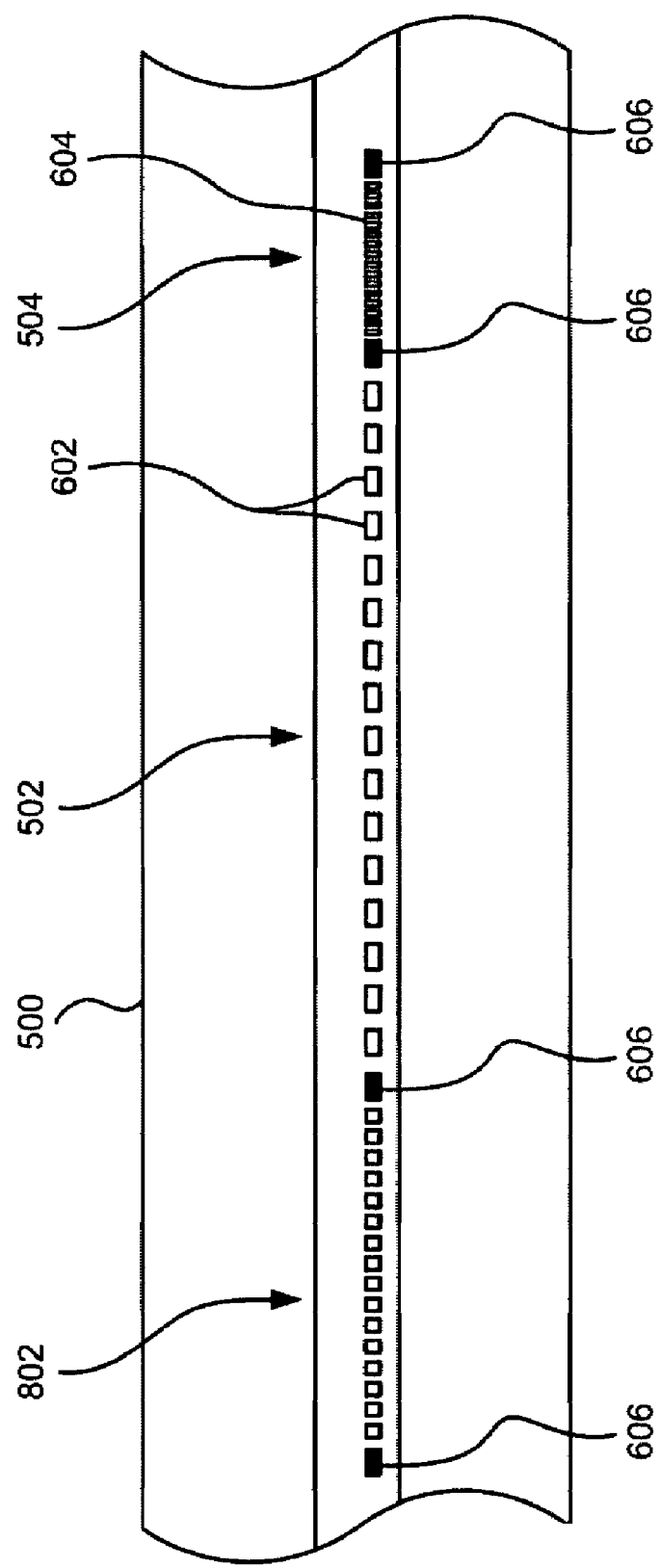
FIG. 8 is a detailed view of a tape bearing surface of a tape head showing three arrays of elements, each for a different format.

Additional embodiments have more than two arrays of elements aligned on a single module, each array associated with a different format. FIG. 8 illustrates an embodiment where three arrays 502, 504, 802 of elements are present. Again, the arrays may share servo elements or not.

Figure 9:
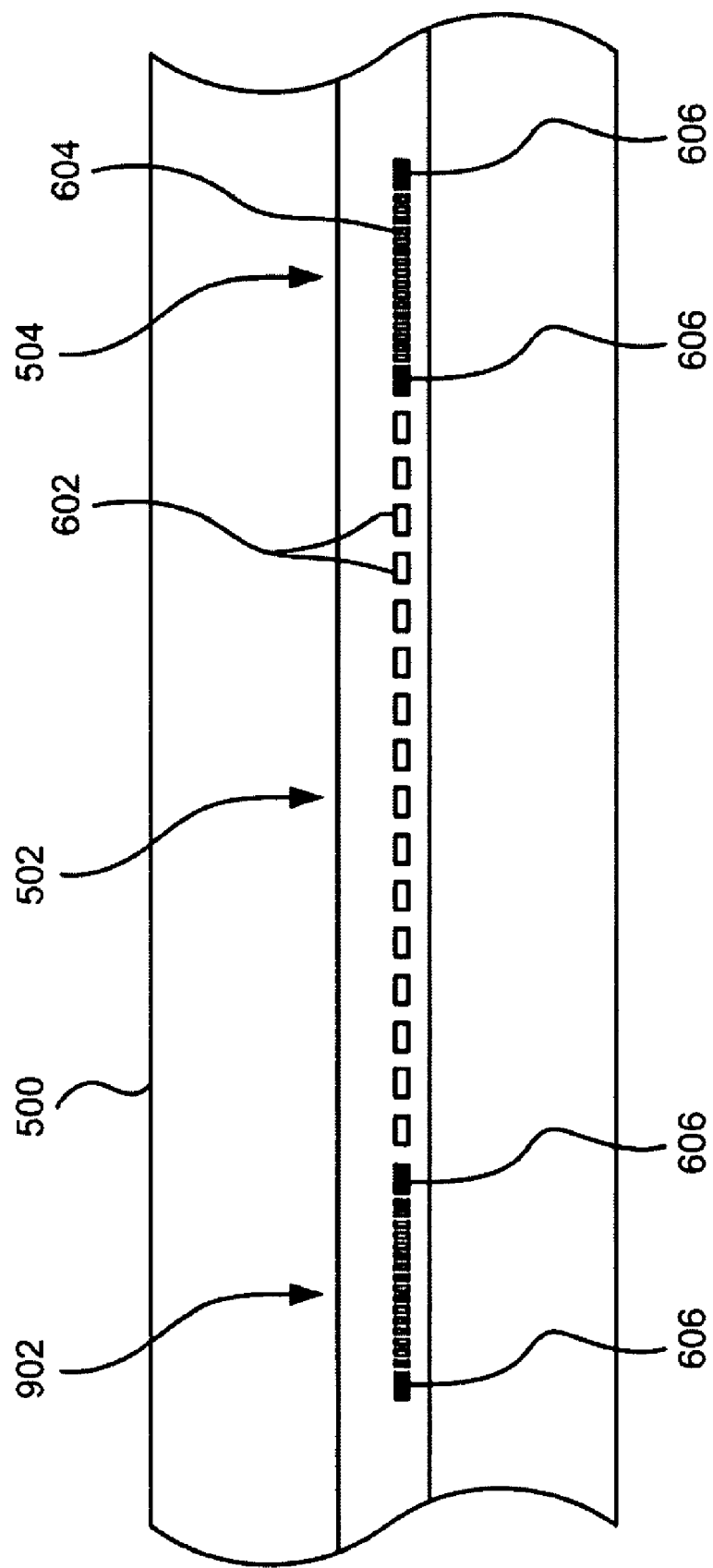
FIG. 9 is a detailed view of a tape bearing surface of a tape head showing three arrays of elements, where one of the arrays is for a first format and two of the arrays are for a second format.

If head width is a critical issue, and assuming that the second array 504 is not was wide as the first array 502 in a direction transverse to the array of elements, a second array 504 and a substantially identical third array 902 can be formed, one on either side of the first array 502. This embodiment is shown in FIG. 9. For data tracks in the second format and positioned on the left side of the tape, the third array 902 (on the left) will read and write data track in the second format on the left side of the tape. For data tracks in the second format and on the right side of the tape, the second array 504 (on the right) will read and write. In this way, the head does not need to have a width that is more than would be required to read or write using the first array 502. Rather, one or both of the second array 504 and the third array 902 will be over data tracks in the second format at any point where the first array 502 is over the tape, thereby reducing the lateral range of motion required for the head to access all data tracks on the tape. Thus, for example, the head need not be wide enough to allow the first array 502 to extend beyond the left edge of the tape to allow the second array 504 to read data along the left tape edge. Rather, the data along the left tape edge can be read by the third array 902. Additionally, fabricating both the second and third arrays 504, 902 may enable using only one chip image for fabricating both left and right modules in a two module head rather than requiring individual chip images or wafers for left and right modules.

In another mode of use, multiple formats can be written to the same tape. Because the arrays are aligned transverse to the tape travel direction, data in each format can be simultaneously written along the tape. This feature would allow, for instance, data to be written in two parallel tracks on the same tape and sent to users having a tape drive capable of reading only one of the formats. Because many blank tapes are sold with servo information already written thereto, some embodiments may require tapes that have servo information for both formats thereon. Other embodiments may write servo information simultaneously with the data, and servo writers would be present in each array. Yet other embodiments may allow writing of the new format onto an adjacent data band. For example, if the tape has four data bands, the bands can be grouped into two pairs. Using the servo track between the pair of bands to align the arrays over each band, one format can be written to one band and another format to the other band. The latter may not be optimal for the newer format, which might require an improved servo data band.

Figure 10:
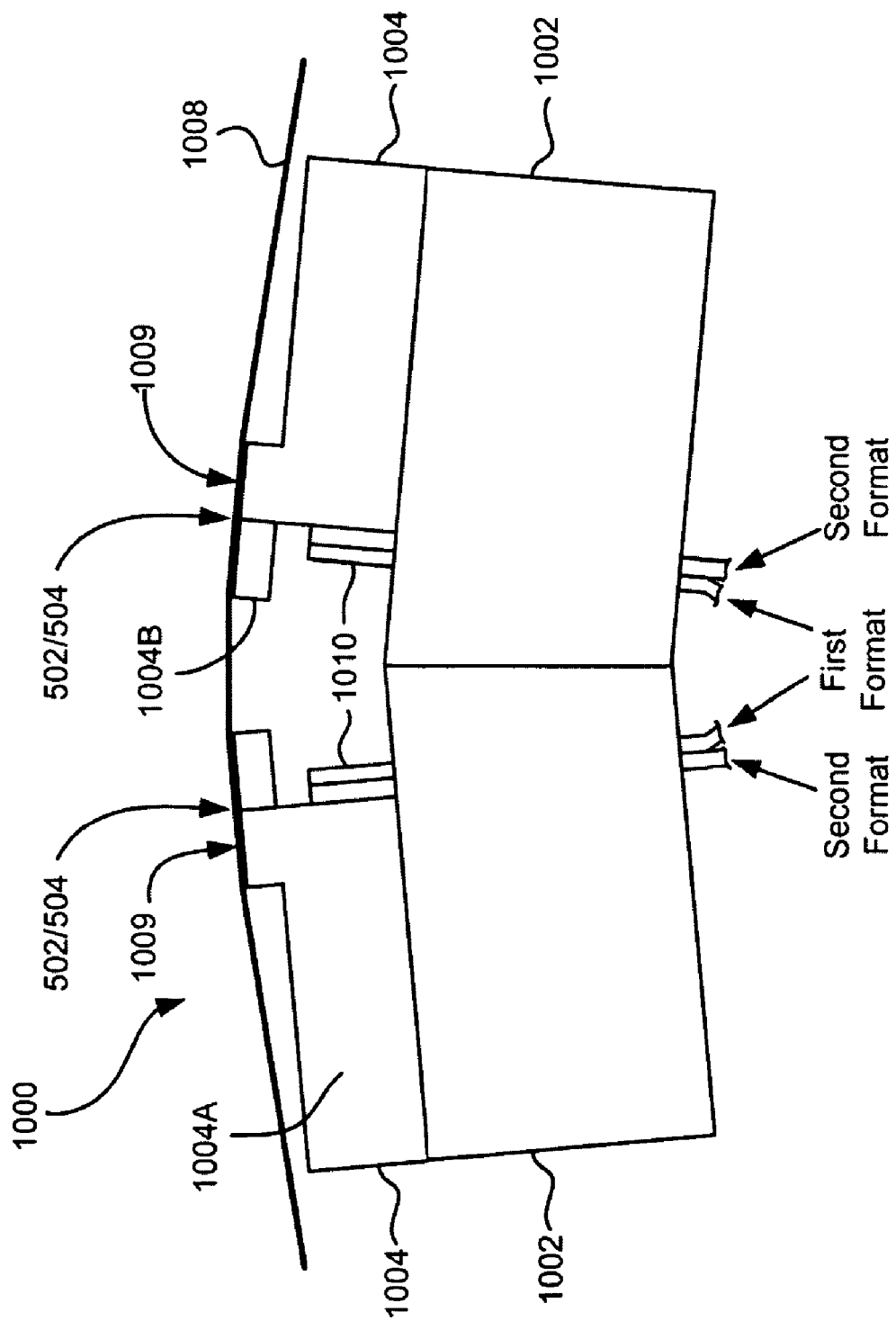
FIG. 10 is a side view of a tape head having two modules according to one embodiment.

As mentioned above, one way to build the head is to have two modules, in a configuration similar to existing heads, e.g., the head of FIG. 1. One such embodiment, shown in FIG. 10, includes a flat-lapped bi-directional, two-module magnetic tape head 1000. As shown, the head includes a pair of bases 1002, each equipped with a module 1004. The bases may be conventional U-beams that are adhesively coupled together. Each module 1004 includes a substrate 1004A and a closure 1004B with multiple arrays 502, 504 situated therebetween. Cables 1010 connect the elements to a controller. The cables 1010 are shown as split into leads for the two formats, but can be joined, fused, intermixed, overlayed, etc. In use, a tape 1008 is moved over the modules 1004 along the tape bearing surfaces 1009 thereof for reading and writing data on the tape 1008. Depending on the format of the data or servo on the tape, the array 502 or 504 on each module corresponding to that format is activated and used to read and/or write to the tape.

Another way to build the head is to have the functions of reading and writing performed on different modules. As shown in the write-read-write (W-R-W) head 1100 of FIG. 11, outer writing modules 1102, 1104 flank a single reading module 1106. As the names imply, the outer modules 1102, 1104 include two or more arrays of writers in a configuration, for example, as shown in FIGS. 6-9. The reading module 1106 includes two or more arrays of readers. The modules 1102, 1104, 1106 are offset and set in relationship with each other such that internal wrap angles are defined between the modules 1102, 1104, 1106. Cables 1109 connect the elements to a controller. The cables 1109 are shown as split into leads for the two formats, but can be joined, fused, intermixed, overlayed, etc.

In this embodiment, the tape bearing surfaces of the modules lie on parallel planes, but are offset in a direction perpendicular to the planes. When the tape 1108 moves across the head 1100 as shown, air is skived from below the tape 1108 by a skiving edge 1110 of the first outer writing module 1102, and instead of the tape 1108 lifting from the tape bearing surface 1112 of the first outer module 1102 (as intuitively it should), the reduced air pressure in the area between the tape 1108 and the tape bearing surface 1112 allow atmospheric pressure to urge the tape towards the tape bearing surface 1112. A trailing end 1120 of the outer writing module 1102 (the end from which the tape leaves the outer writing module 1102) is the reference point which defines the wrap angle $\alpha_o$ over the tape bearing surface of the inner reading module 1106. The same is true of the other outer writing module 1104 when the tape travel direction is reversed.

Figure 11:
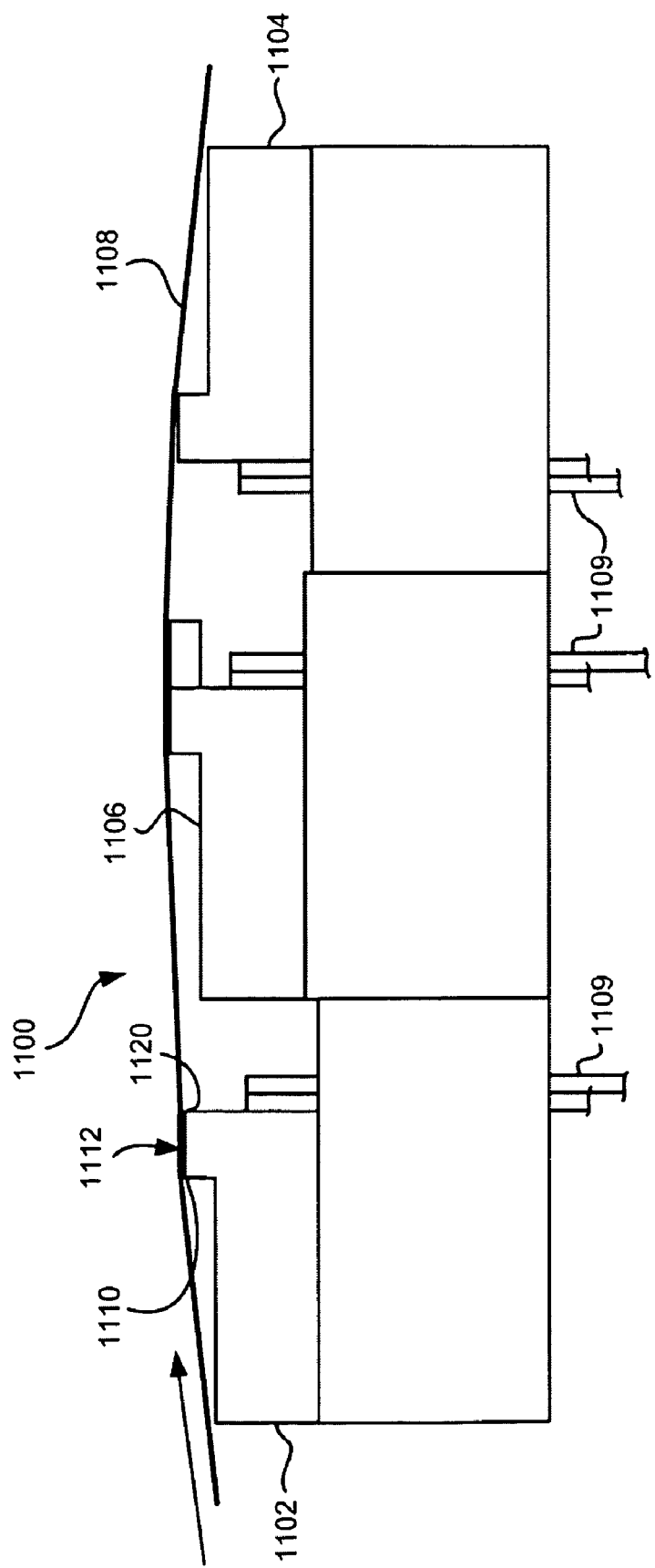
FIG. 11 is a side view of a tape head having three modules according to one embodiment.

Variations on the head 1100 of FIG. 11 include a R-W-R head, a R-R-W head, a W-W-R head, etc. For example, in a R-W-R head, the outer modules 1102, 1104 perform reading while the middle module 1106 performs writing. In a R-R-W head, the leading module 1102 and middle module 1106 perform reading while the trailing module 1104 performs writing. In a W-W-R head, the leading module 1102 and middle module 1106 perform writing while the trailing module 1104 performs reading. Again, the leading and trailing modules 1102, 1104 may operate concurrently with each other and the middle module 1106, may operate individually, or may operate in combinations of two modules.

An advantage of the multiple module head is that each module has no more wiring leads than a module in a two module head having both read and write elements. For instance, assume a legacy format head has 16 readers and 16 writers per module. Adding an array of second format elements would add 32 more elements, or 64 more wires. However, if each module has only readers or writers, albeit in two formats, the number of wires per module is the same as the legacy read/write head. Accordingly, existing cabling can be used, the number of wires per head is minimized, etc.

Another advantage is that air is entrained between the tape and the trailing outer module (1104 in FIG. 11), thereby reducing wear.

The three module design is also preferred, as the total gap thicknesses and build complexity are minimized, and head yield is optimized.

The invention is not limited to flat profile heads; heads having rounded and other geometric tape bearing surfaces are also within the spirit and scope of the present invention.

In any of the embodiments described herein, the heads can be fabricated in conventional ways. To reduce cost and complexity, one lead for an element of the first array may be commoned with one lead for an element of the second array (and so on for additional arrays) to minimize head wiring, an on-going goal in head design.

A data storage system as described herein may include one or more of the following components. A device for interfacing with a data medium is present in some embodiments. Examples of such an interface device include a drive, socket, bay, etc. that interfaces with a data medium. For example, in a tape-based data storage system, a drive is used to read and write to tape, the drive including a bay for a tape cartridge. The data storage system may include a plurality of interface devices.

Figure 12:
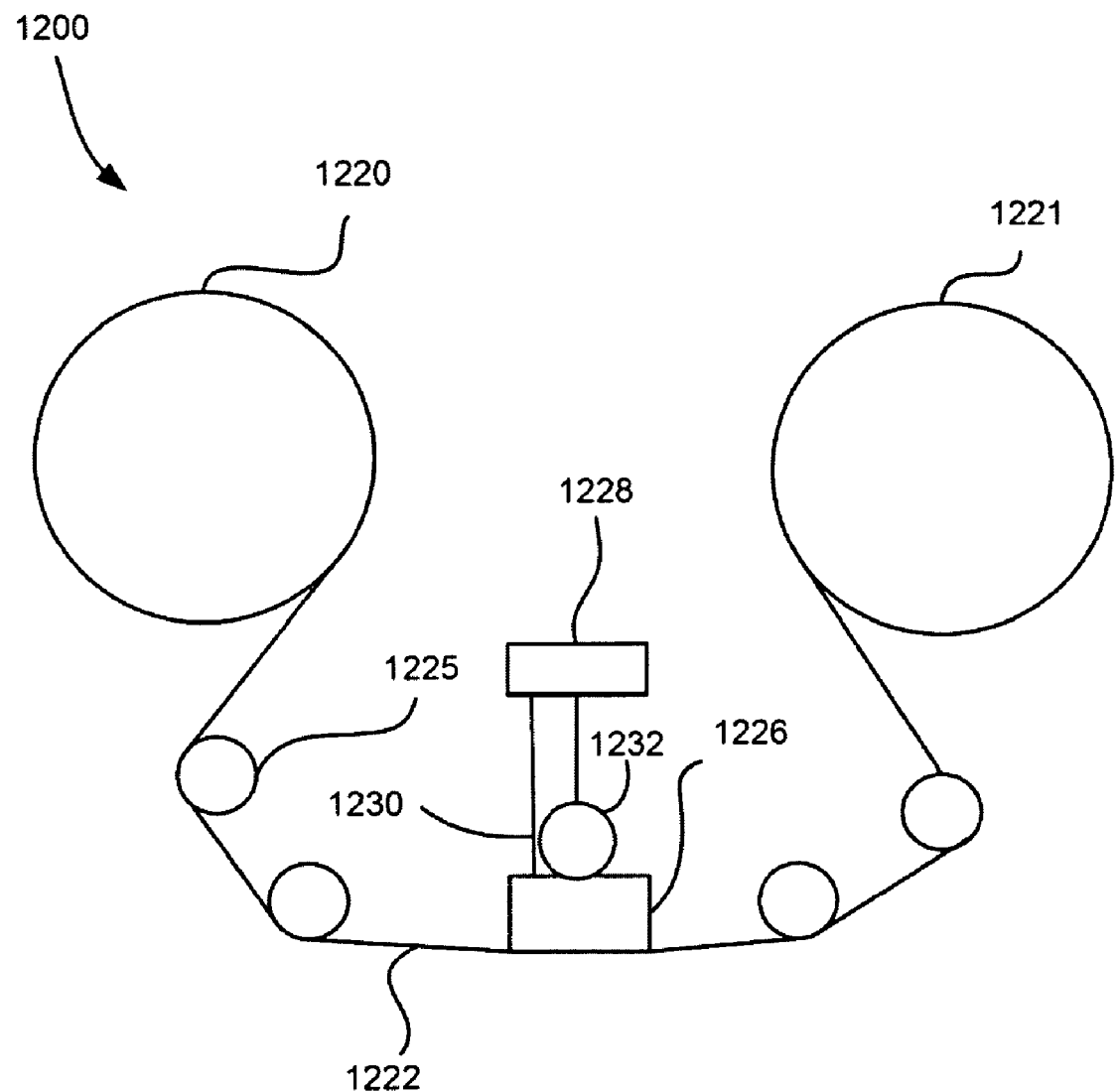
FIG. 12 is a schematic diagram of a tape drive system.

FIG. 12 illustrates a simplified tape drive 1200 which may be employed in the context of the present invention. While one specific implementation of a tape drive 1200 is shown in FIG. 12, it should be noted that the embodiments of the previous figures may be implemented in the context of any type of tape drive system.

As shown, a tape supply cartridge 1220 and a take-up reel 1221 are provided to support a tape 1222. These may form part of a removable cassette and are not necessarily part of the system. Guides 1225 guide the tape 1222 across a preferably bidirectional tape head 1226, of the type disclosed herein. An actuator 1232 controls position of the head 1226 relative to the tape 1222. The tape head 1226 is in turn coupled to a controller assembly 1228 via an MR connector cable 1230. The controller 1228, in turn, controls head functions such as servo following, write bursts, read functions, etc. The controller 1228 runs under the control of computer instructions typically in firmware or software run locally or on a host system.

A tape drive, such as that illustrated in FIG. 12, includes drive motor(s) to drive the tape supply cartridge 1220 and the take-up reel 1221 to move the tape 1222 linearly over the head 1226. The tape drive also includes a read/write channel to transmit data to the head 1226 to be recorded on the tape 1222 and to receive data read by the head 1226 from the tape 1222. An interface is also provided for communication between the tape drive and a host (integral or external) to send and receive the data and for controlling the operation of the tape drive and communicating the status of the tape drive to the host, all as will be understood by those of skill in the art. Examples of a host system include a computer, server, handheld device, etc. in communication with the interface device.

Figure 13:
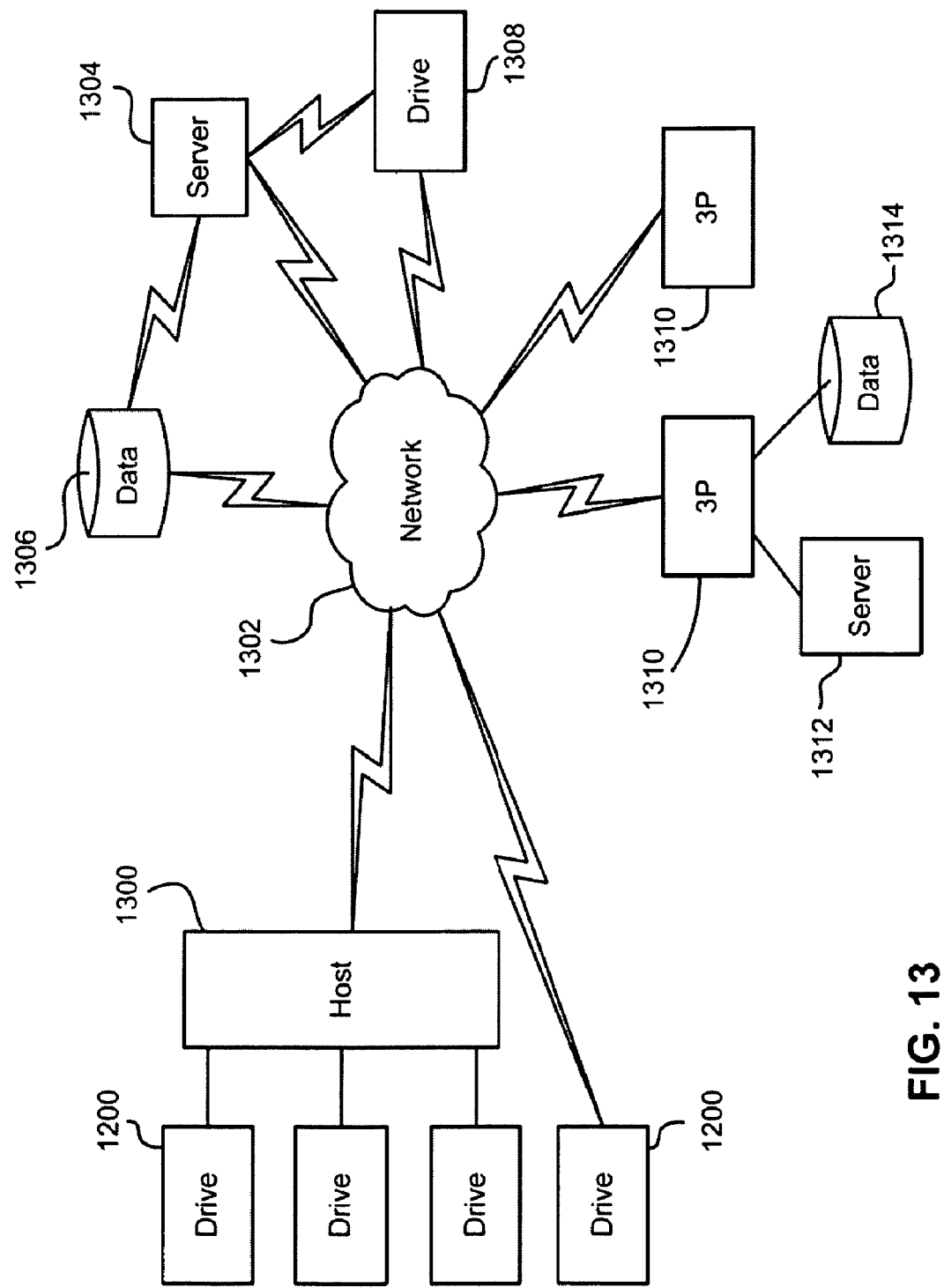
FIG. 13 is a schematic diagram of a data storage system.

As shown in FIG. 13, the drive(s) 1200 and/or host 1300 can be coupled to a network 1302 such as the Internet. The data storage system may further include networked resources, such as remote servers 1304, remote databases 1306, remote media interface devices 1308, etc.

Third party systems 1310 may be in communication with the data storage system. Such third party systems 1310 may include servers 1312, databases 1314, etc. and may be associated with a vendor of the drives, a vendor of software or firmware, etc.

As mentioned earlier, the present invention is directed to all types of data storage devices, and so is not to be limited to tape-based data storage systems only.

The methods of the invention disclosed below allow customers to choose which mode they need, and when to use it. For example, the methods described below allow tape-based data storage system owners to upgrade to the next generation capacity and data-rate without the need to change their existing hardware.

Figure 14:
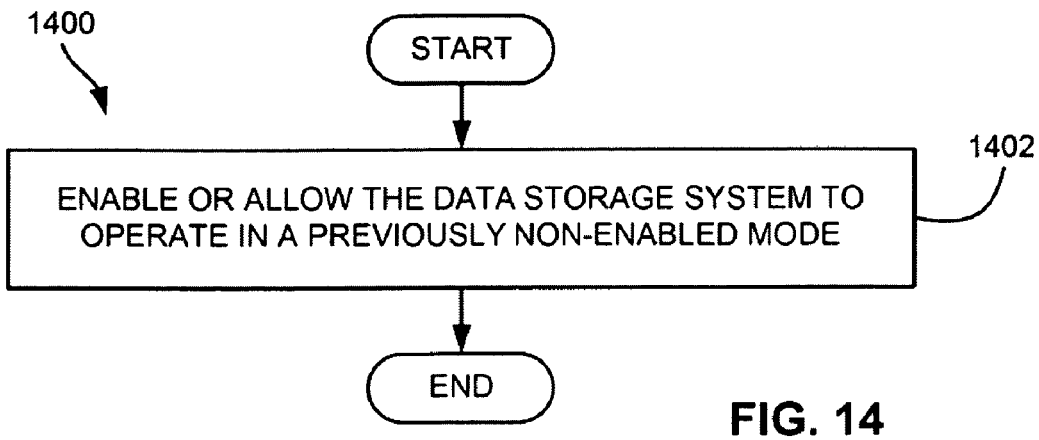
FIG. 14 is a process diagram graphically depicting a method for enabling different modes on a multi-modal data storage system according to one embodiment of the present invention.

FIG. 14 illustrates a basic method 1400 for enabling different modes on a multi-modal data storage system according to one embodiment of the present invention. As apparent from the term "multi-modal," data storage system is capable of operating in two more modes. However, an ability to operate in at least one of the modes is not enabled (e.g., allowed, made functional, etc.) prior to enabling the data storage system to operate in that particular mode. In operation 1402, the data storage system is enabled or allowed to operate in a previously non-enabled mode.

Each mode provides a different set of features or functionality. In one embodiment, the modes may relate to enabling the data storage system to operate with various media, such as interfacing with portable or fixed media in various formats. For instance, in a tape-based data storage system having a head with a module 500 shown in FIG. 5 and is thus capable of reading and writing to tape in two formats, one mode may enable operation of elements 502, while the other mode allows operation of elements 504.

Only one mode may be initially active with other modes not enabled or allowed. Alternatively, both or none of the modes are initially active. Both modes may be enabled simultaneously, allowing the drive to read and/or write to data in the two formats (depending on the type of media currently present). As an option, only one mode may be permitted to be enabled at a time, all other modes being disabled until reactivated. After the second mode is enabled, the drive automatically reads the cartridge memory and determines which format the tape is in, and through the firmware, software or hardware, will instruct the drive which circuits to activate in order to read the format corresponding to the currently-inserted media.

In other embodiments, the modes may refer to accessing certain features on the media available only when a certain mode is enabled. For example, an optical disk may include a nonvolatile memory chip. In the first mode, the data storage system may only be able to read the optical disk. If the second mode is enabled, the data storage system may be able to read, write, and rewrite data to and from the optical disk. If the third mode is enabled, the data storage system may be able to read and write to and from the nonvolatile memory, as well as perform the functions of the first and second modes.

In one embodiment, the data storage system has all physical components required to operate in the first and second modes. For example, in the tape head embodiments presented above, the heads have the two or more arrays required to read and write to two different formats. Whatever the configuration, the firmware, software or hardware controls which array is engaged. Note, however, that software or firmware may or may not be present, and may or may not be considered a physical component in the various embodiments. Thus, even though the required physical components are available, the second mode may not be enabled because the requisite software or firmware is not installed. Alternatively, even though the required physical components including software are available, the second mode may not be enabled.

Figure 15:
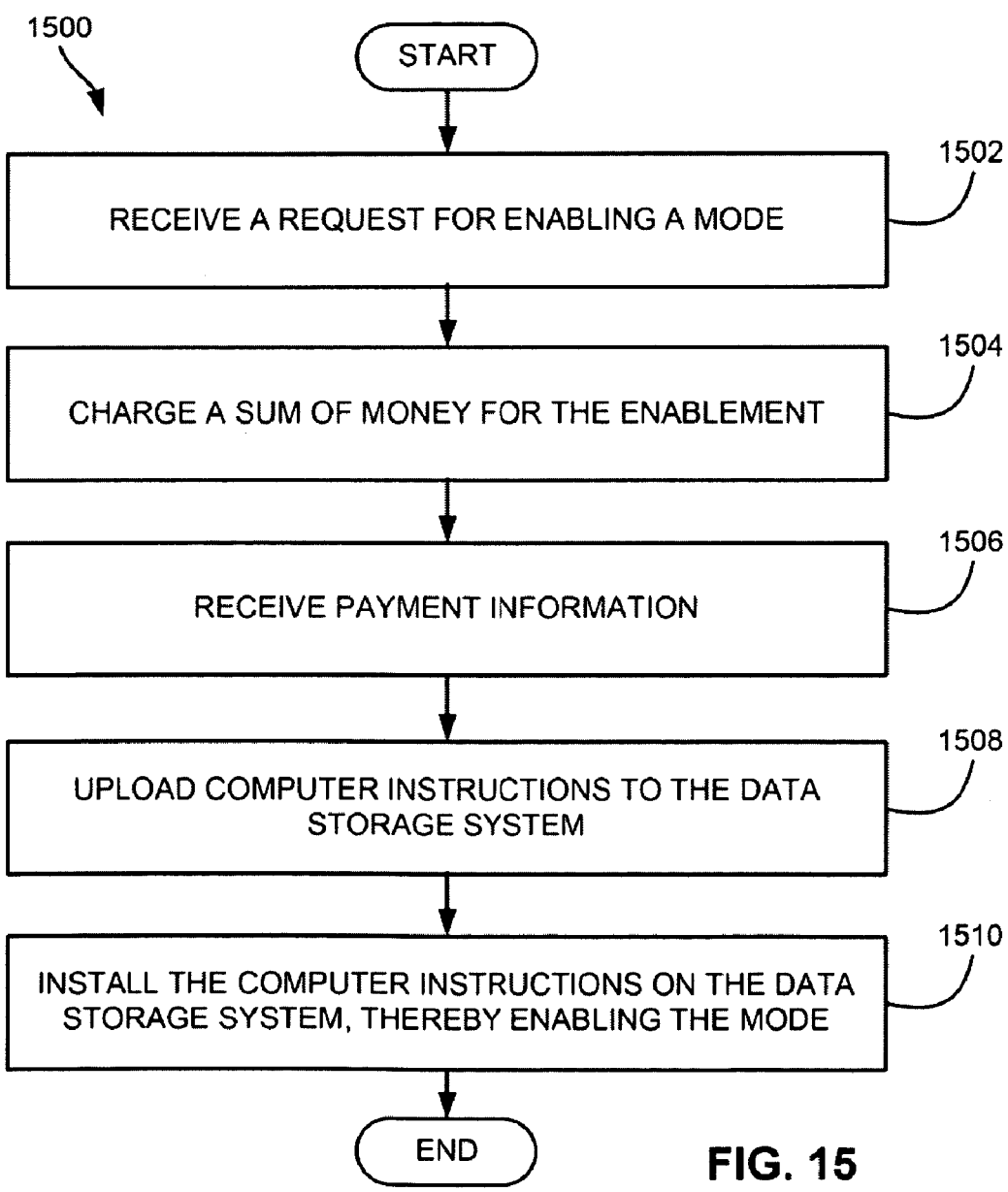
FIG. 15 is a process diagram graphically depicting a method for enabling a mode in a data storage system.

Several methods for enabling a mode not currently enabled are contemplated. FIG. 15 illustrates one such method 1500. Assume that the original product is sold with one mode enabled but a second mode not enabled because the required software or firmware (or portion thereof) is not installed. By selling the original product with firmware or software for only one mode, unauthorized enablement of the second mode by accessing the firmware or software can be reduced.

With continued reference to FIG. 15, in operation 1502, a request for enabling a mode is received, such as via a network, telephone call, etc. A sum of money is charged for the enablement in operation 1504. Therefore, in operation 1506, payment information regarding how the customer will pay for the enablement is received. Payment information can include identification of a customer's account, credit card information, etc. In operation 1508, computer instructions (firmware or software) are uploaded to the data storage system via a network. In operation 1510, the computer instructions are installed on the data storage system thereby enabling the second mode. Note that in this and the other processes presented herein, additional functions may also be performed, including but not limited to the authorization and/or verification functions described below.

Figure 16:
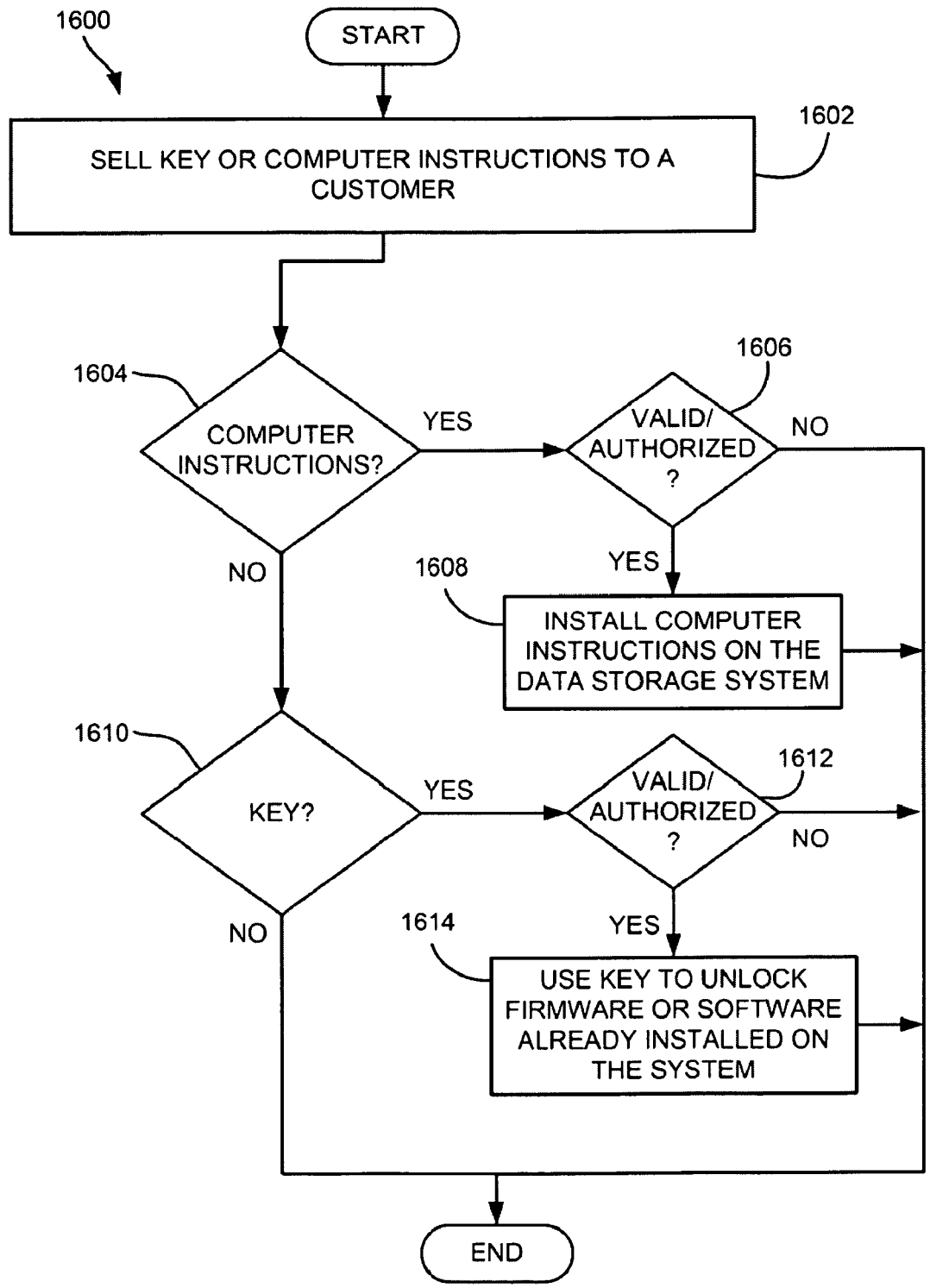
FIG. 16 is a process diagram graphically depicting a method for enabling a mode in a data storage system.

FIG. 16 illustrates another method 1600 for enabling a mode not currently enabled. In operation 1602, computer instructions (firmware, software), or a key is sold on a computer readable medium such as a memory module, a disk or other medium. The key can also be sold verbally, in electronic form such as via email or displayed on a web page, printed on paper, etc. If computer instructions are purchased (decision 1604), the computer instructions are authorized and or verified in operation 1606, and if authorized or valid, installed on the data storage system in operation 1608 thereby enabling the second mode. Alternatively, if a key is purchased (decision 1610), the key is authorized and/or verified in operation 1612 and if authorized or valid, used in operation 1614 to unlock software or firmware already installed on the system, e.g., as purchased or installed during original installation, or available on the original software medium sold with the system or drive. Note that the key can also be used to unlock the software just installed, and so functions as an anti-piracy safeguard.

Figure 17:
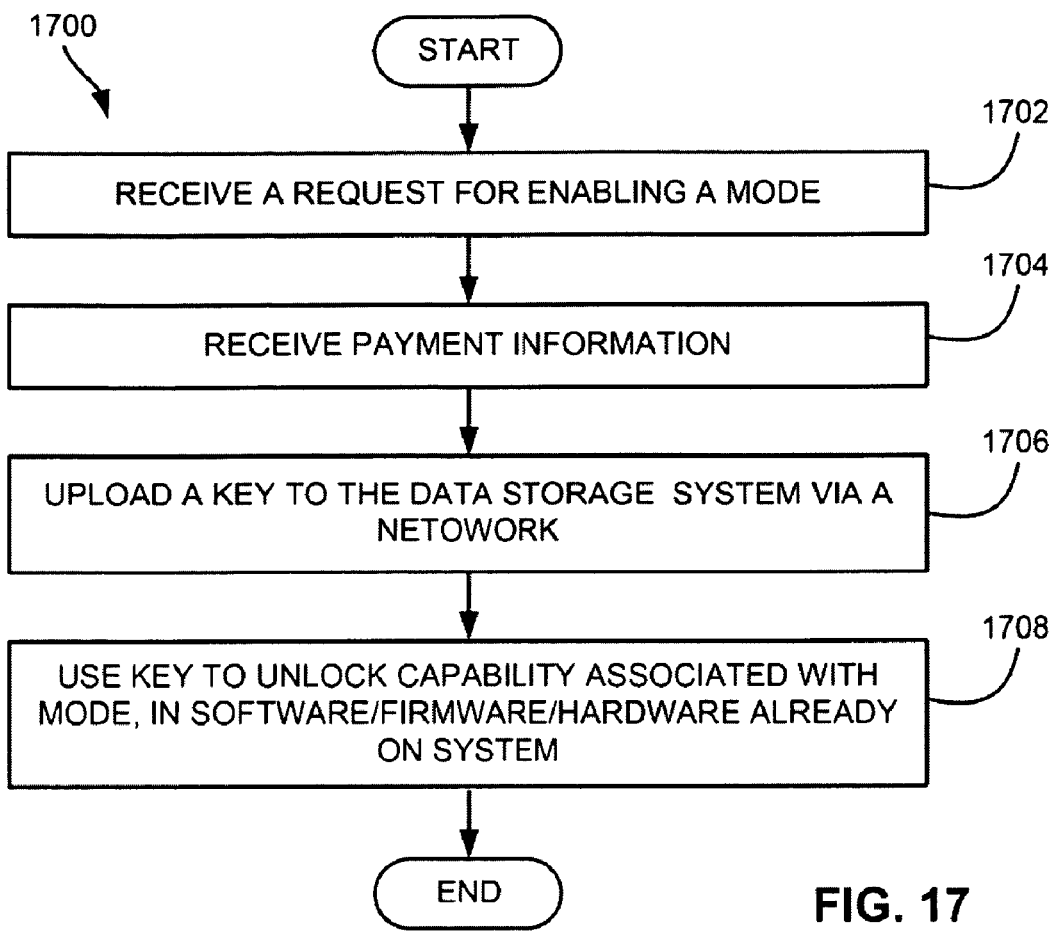
FIG. 17 is a process diagram graphically depicting a method for enabling a mode in a data storage system.

FIG. 17 illustrates a process 1700 for enabling a mode not currently enabled. In operation 1702, a request for enabling a mode is received, such as via a network, telephone call, etc. In operation 1704, payment information is received. In operation 1706, a key is uploaded to the data storage system via a network. In operation 1708, the key is used to unlock the capability in firmware, software or hardware already on the drive or host system.

Combinations and permutations of features of the above-recited methods are also possible and considered to be within the scope of the present invention. Further, a vendor can allow the user to purchase a blank drive, and sell the firmware, software or key independently for whichever mode the user desires.

Security protocols and features may be provided to deter unauthorized access to the various modes. Any desired security protocol or feature may be implemented in the present invention, including encryption, authorization, and verification functions. Several illustrative security features are set forth below.

One embodiment uses an identification code unique to the particular firmware, software or hardware, and may be a code printed on the hardware or software container, or can be similar to (or the same as) the key described above. The user must enter the identification code before or during installation to permit installation or use of the firmware or software. The system can connect to a remote server and transmit the code to the remote server for verification. If the code has not been used, the server transmits authorization to enable the firmware or software. If the code has already been used, server does not send authorization to enable the firmware or software.

Another embodiment requires that the key or identification code correspond to a serial number (or other identifier) of the drive, firmware or software. Only if the key or code is associated with the serial number will the new functionality be enabled. For example, assume a customer has a drive and wants to enable a second mode. The customer logs on to a supplier website and enters the serial number of the drive. The supplier website server then uploads the software or key to the customer's system. The software or key includes the serial number, which the drive or host system checks against the stored serial number of the drive or already-installed software or firmware. If the numbers match, the new functionality is enabled. If the numbers do not match, as in the case where a customer is attempting to use a pirated copy of the software, the new functionality is not enabled.

Note that the multi-modal data storage system may cost more than a single-mode data storage system from the same seller and/or a competitor. However, it is anticipated that the multi-modal data storage system may be sold for less than the combined cost of two single-mode systems, e.g., each one being for a different format. Further, as part of a strategic plan to gain market share, the multi-modal data storage system may be sold with one or more modes operational for the same price or less than the price of a single-mode system from the same seller and/or a competitor.

Figure 18:
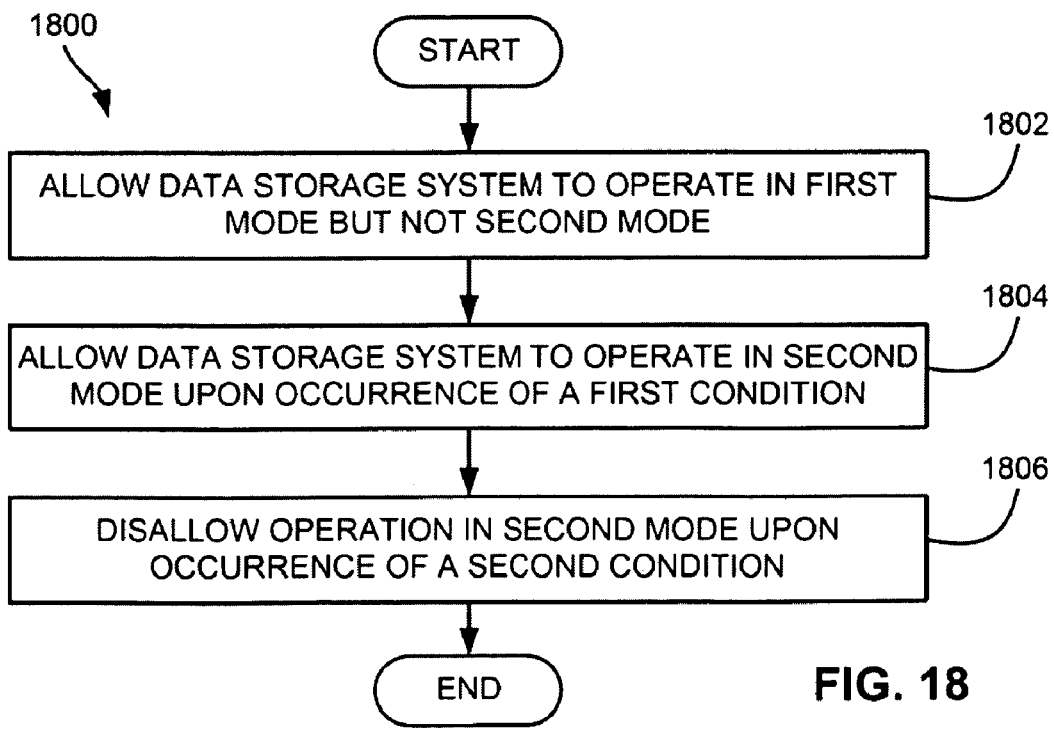
FIG. 18 illustrates a method for on-demand enablement of functionality of a multi-modal data storage system.

The invention enables business on-demand with respect to data storage. FIG. 18 illustrates a method 1800 for on-demand enablement of functionality of a multi-modal data storage system. In operation 1802, a data storage system is allowed to operate in a first mode but not a second mode, the first mode being different than the second mode. Again, the modes may refer to such things as compatibility with a data storage medium.

In operation 1804, the data storage system is allowed to operate in the second mode upon occurrence of a first condition. Illustrative first conditions include the purchase and installation of computer instructions, receipt of a key, etc.

In operation 1806, upon occurrence of a second condition, the data storage system is no longer allowed to operate in the second mode. The second condition may include expiration of a prespecified time period, e.g., one month, etc. The second condition may be receipt of an instruction from a user of the data storage system that the second mode is no longer needed. Operation 1806 may entail mere disablement of features, or may entail a firmware or software downgrade, including a reversion back to a prior version.

EXAMPLE 1

Assume a customer has a huge library of legacy media, e.g., tapes, and wants to continue using the legacy format, but wants to see an increase in writing and reading speed that is only available in newer drives. The customer purchases a tape drive having the attribute of two mode capability, where the modes refer to the legacy format and a new tape format. The tape drive as sold has only one of the two modes active, here, the legacy format. The tape drive is sold for less money than if both modes were activated. In the instant case, the customer does not presently need both modes, but has the option to switch. The customer saves money because the drive is sold for less than it would if both formats were active in drive. When the customer is ready, the customer can then switch to the new format almost at will by purchasing the firmware, software or key that enables operation in the newer format. Thus, the customer can defer some costs to when an upgrade is needed, yet not have to purchase all new hardware.

EXAMPLE 2

Assume an acquiring company anticipates a merger, where the incoming company uses tapes in a different format than the customer uses. The acquiring company does not have drives capable of reading the incoming company's tapes, and does not want to purchase another storage system just for those tapes. The acquiring company purchases several multi-format drives with the new format enabled and the old format disabled, and replaces the single-format drives in its drive library with the multi-format drives. This way, the acquiring company does not have to pay for the format used by the incoming company, yet has the capability to purchase a key (or software/firmware) that enables the capability to read the old format if the merger goes through.

EXAMPLE 3

Assume a customer sees a seasonal increase in sales around the Christmas holidays, and so needs extra data storage performance for only the time period surrounding Christmas. The customer has several multi-format tape drives in its library, each with only an older format enabled. In anticipation of the holiday season, the customer switches to the higher capacity and data-rate via a firmware upgrade. After the season, when the higher capacity and data rate are not needed, a firmware downgrade brings the customer's system back to lower capacity and performance. The customer can be charged for the enablement on a one-time basis, on a per-time-period-basis, for a period of actual use, etc. The ability to read the higher capacity tapes may be or remain enabled after the customer's system is reverted back to the lower capacity. Alternatively, the customer may be required to purchase the ability to read such higher capacity tapes on an as-needed or permanent basis.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for enabling different modes on a multi-modal tape-based data storage system, the method comprising:

enabling a tape-based data storage system to operate in a first of at least two modes, the first of the modes being different than a second of the modes, wherein the first mode includes operation in a first tape format and the second mode includes operation in a second tape format, and allowing the data storage system to operate in the second of the modes only upon at least one of installation of additional computer instructions and receiving a key.

2. The method as recited in claim 1, wherein each mode corresponds to an ability to operate in a particular format.

3. The method as recited in claim 1, wherein the data storage system has all physical components required to operate in the first and second modes.

4. The method as recited in claim 1, further comprising charging a sum of money for enabling the data storage system to operate in the at least one of the two modes.

5. A method for enabling operation in different tape formats on a multi-modal tape-based data storage system, the method comprising:

enabling a tape-based data storage system to operate in a second format different than a first format, the tape-based data storage system being enabled to operate in the first format but not in the second format prior to enabling the tape-based data storage system to operate in the second format, wherein enabling the data storage system to operate in the second format includes at least one of installation of computer instructions, and using a key to unlock functionality for enabling the data storage system to operate in the second format, wherein the operation in the second format includes at least one of reading and writing in the second format.

6. The method as recited in claim 5, wherein the tape-based data storage system is enabled to operate in the second format by installation of the computer instructions, the tape-based data storage system being incapable of operating in the second format without the computer instructions.

7. The method as recited in claim 6, wherein the computer instructions are loaded to the tape-based data storage system via a network.

8. The method as recited in claim 6, wherein the computer instructions are presented to the tape-based data storage system on a computer readable medium.

9. The method as recited in claim 5, wherein the tape-based data storage system is enabled to operate in the second format by receipt of the key, and further comprising determining whether the key is authorized or valid prior to enabling the tape-based data storage system to operate in the second format.

10. The method as recited in claim 5, further comprising executing a security protocol for determining whether to enable the tape-based data storage system to operate in the second format.

11. The method as recited in claim 5, wherein the tape-based data storage system includes a first array of elements associated with the first format and a second array of elements associated with the second format.

12. The method as recited in claim 5, further comprising charging a sum of money for enabling the tape-based data storage system to operate in the second format.

13. A method for on-demand enablement of functionality of a multi-modal data storage system, the method comprising:

allowing a tape based data storage system to operate in a first mode but not a second mode, the first mode being different than the second mode, wherein the first mode includes operation in a first tape format and the second mode includes operation in a second tape format;

allowing the data storage system to operate in the second mode upon occurrence of a first condition, wherein the first condition includes a purchase of computer instructions; and upon occurrence of a second condition, no longer allowing the data storage system to operate in the second mode.

14. The method as recited in claim 13, wherein the mode of operation relates to compatibility with a data storage medium.

15. The method as recited in claim 13, wherein the computer instructions are purchased from a third party.

16. The method as recited in claim 15, wherein the computer instructions are selected from a group consisting of firmware, software, and a key.

17. The method as recited in claim 13, wherein the second condition is expiration of a prespecified time period.

18. The method as recited in claim 13, wherein the second condition is receipt of an instruction from a user of the data storage system.

19. The method as recited in claim 13, wherein the data storage system is a tape-based data storage system.

20. The method as recited in claim 13, further comprising charging a sum of money for enabling the data storage system to operate in the second mode.

* * * * *